(12) United States Patent
Lee et al.

(10) Patent No.: US 9,800,343 B2
(45) Date of Patent: Oct. 24, 2017

(54) METHOD AND SYSTEM FOR COMPENSATING FOR LATENCY DIFFERENCE DUE TO SWITCHOVER IN FRONTHAUL IN RING TOPOLOGY FORM

(71) Applicant: HFR, Inc., Gyeonggi-do (KR)

(72) Inventors: Sun Ik Lee, Yongin-si (KR); Sang Woo Kim, Yongin-si (KR); Myeong Hun Song, Yongin-si (KR); Beum Geun Cho, Yongin-si (KR)

(73) Assignee: HFR, Inc. (KR)

( * ) Notice: Subject to any disclaimer, the term of this patent is extended or adjusted under 35 U.S.C. 154(b) by 0 days.

(21) Appl. No.: 15/193,381

(22) Filed: Jun. 27, 2016

(65) Prior Publication Data

US 2017/0237495 A1   Aug. 17, 2017

(30) Foreign Application Priority Data

Feb. 15, 2016   (KR) ........................ 10-2016-0017173

(51) Int. Cl.
*H04B 10/275*   (2013.01)
*H04J 14/02*   (2006.01)
*H04B 10/25*   (2013.01)

(52) U.S. Cl.
CPC ....... *H04B 10/275* (2013.01); *H04B 10/2503* (2013.01); *H04J 14/02* (2013.01)

(58) Field of Classification Search
CPC .... H04J 14/02; H04J 14/0227; H04J 14/0221; H04J 14/0212; H04J 14/0283; H04B 10/275; H04B 10/2503
See application file for complete search history.

(56) References Cited

U.S. PATENT DOCUMENTS 7,493,129 B1 *   2/2009  Mostafa ............ H04W 56/0045
                                                455/502
2002/0165962 A1 * 11/2002 Alvarez ................... G06F 8/65
                                                709/226

* cited by examiner

*Primary Examiner* — Ted Wang
(74) *Attorney, Agent, or Firm* — Harness, Dickey & Pierce, P.L.C.

(57) ABSTRACT

A system for compensating for a latency difference in a fronthaul in ring topology is provided, including a centralization node linked to a BBU group, a plurality of distribution nodes linked to a plurality of RRH groups, an optical bi-directional ring network connecting the central node and the distribution nodes and allows a WDM optical signal to be transmitted and received between the central node and the distribution nodes, and a FIFO buffer that stores an electrical signal. Each of the distribution nodes demultiplexes the WDM optical signal, converts each demultiplexed optical signal into an electrical signal, stores the electrical signal in the FIFO buffer, converts the electrical signal stored in the FIFO buffer into an optical signal, and adjusts a size of the FIFO buffer, thus compensating for a difference between latencies before and after an occurrence of a switchover in the optical bi-directional ring network.

20 Claims, 6 Drawing Sheets

METHOD AND SYSTEM FOR COMPENSATING FOR LATENCY DIFFERENCE DUE TO SWITCHOVER IN FRONTHAUL IN RING TOPOLOGY FORM

CROSS-REFERENCE TO RELATED APPLICATIONS

The present application is based on, and claims priority from, Korean Patent Application Number 10-2016-0017173, filed Feb. 15, 2016, the disclosure of which is incorporated by reference herein in its entirety.

TECHNICAL FIELD

The present disclosure in some embodiments relates to a method for compensating for a difference of latency due to a switchover from a fronthaul which is configured in a ring topology. More particularly, the present disclosure in some embodiments relates to a method for compensating for a difference between latencies before and after a switchover by adjusting the size of a FIFO buffer.

BACKGROUND

The statements in this section merely provide background information related to the present disclosure and do not necessarily constitute prior art.

Dramatic developments of computer, electronics and communication technologies in recent times have realized various network communication services to offer. This has led to developments of wired communication and wireless communication services beyond the voice service towards ongoing multimedia communication services for transmitting data such as packet data.

The data demand has been increasing continuously, and the explosive growth of smart phones makes it predictable that traffic demands will grow ever more by time. Trying to resolve the increasing traffic, a cloud based network technology has been developed wherein a network is divided into an upper parent group and sub-groups, of which the parent group is centralized and the sub-groups are distributed to service the local areas in need, and thereby provides an efficient resource management, which is called C-RAN (Centralized Radio Access Network).

Existing passive networks have their advantages of allowing an easy installation of a base station to where it is necessary to add, but the integrated management of base stations is difficult, providing no line protection, resulting in deteriorated operational reliability. In addition, a conventional base station needs to colocate a digital signal processing apparatus (corresponding to a base band unit or BBU detailed hereinafter) and a wireless signal transmitting/receiving unit (corresponding to a remote radio head or RRH detailed hereinafter), of which the former generates high heat which requires added facilities such as an air conditioner. Then, such added base stations mean increased wastes of spaces and an increased cost of installations. The C-RAN is the proposed structure in order to solve these deficiencies.

In the C-RAN, with a terminal as a reference point, a network at the prior stage to the terminal is called a fronthaul, and another network at its rear stage is called a backhaul, of which the fronthaul structure mainly characterizes the C-RAN. The digital signal processing apparatus (BBU) has a high unit price, occupies a lot of space for amenities such as air conditioning, and requires ongoing management due to a profuse heat generation. To the contrary, the radio signal transmitting and receiving apparatus (RRH) has a low unit price, occupies less space, and generates less heat, making it easy to manage. Thus, the fundamental concept of the backhaul is to centralize a digital signal processing apparatus (BBU) and to distribute radio signal transmitting and receiving apparatuses (RRH).

In the fronthaul, the digital signal processing apparatus (BBU) and the radio signal transmitting and receiving apparatuses (RRH) are interlinked via an optical network. The physical topologies selected in an optical network design include a ring shape, a bus shape and a star shape among others. Of these, the ring topology allows an easy restoration work at the time of system switchover due to natural disasters or accidents, and it has been recognized for its reliability in backbone network for a long time. Therefore, the connection of the optical fiber cable in the fronthaul is generally established in the form of ring topology which needs less consumption of fiber optic cable and provides a protective switchover function.

However, if a switchover occurred in the fronthaul which is configured in a ring topology changes the signal transmission direction to possibly change the network latency, there is a risk of an error generated thereby from various control operations performed based on latency.

As an example, one of different methods in which a terminal performs a handover is to utilize latency. Upon receiving radio signals from a plurality of base stations, the terminal may measure the latencies of the respective radio signals to determine the base station with the shortest latency and perform the connection with that base station. In other words, if the shortest latency status transitions from base station A to base station B due to a movement of the terminal, the terminal performs a handover to base station B.

When a switchover occurred in the fronthaul in the ring topology changes the signal transmission direction to change the network latency despite no movement of the terminal, a handover may be carried out thereby to any other base station even if no handover is actually necessary.

SUMMARY

A system for compensating for a latency difference due to switchover in a fronthaul in ring topology, according to some embodiments of the present invention, includes a centralization node linked to a baseband unit (BBU) group centralized in a central office, a plurality of distribution nodes (e.g., remote terminal (RT)) linked to a plurality of remote radio head (RRH) groups distributed in remote locations, an optical bi-directional ring network connecting the central node and the plurality of distribution nodes, and a first-in-first-out (FIFO) buffer. The optical bi-directional ring network is configured to allow a wavelength-division multiplexed (WDM) optical signal to be transmitted and received between the central node and the plurality of distribution nodes. And the FIFO buffer is configured to store an electrical signal. Each of the plurality of distribution nodes is configured to demultiplex the WDM optical signal, convert each demultiplexed optical signal into an electrical signal, store the electrical signal in the FIFO buffer, convert the electrical signal stored in the FIFO buffer into an optical signal, and adjust a size of the FIFO buffer, thus compensating for a difference between latencies before and after an occurrence of a switchover in the optical bi-directional ring network.

According to some embodiments of the present invention, a method of compensating for a latency difference due to switchover in a fronthaul in ring topology, where the fronthaul includes a centralization node linked to a baseband unit (BBU) group centralized in a central office, a plurality of distribution nodes linked to a plurality of remote radio head (RRH) groups distributed in remote locations, an optical bi-directional ring network connecting the central node and the plurality of distribution nodes and configured to allow a wavelength-division multiplexed (WDM) optical signal to be transmitted and received between the central node and the plurality of distribution nodes, and a first-in-first-out (FIFO) buffer configured to store an electrical signal, includes demultiplexing the WDM optical signal, converting each demultiplexed optical signal into an electrical signal, storing the electrical signal in the FIFO buffer, converting the electrical signal stored in the FIFO buffer into an optical signal, and adjusting a size of the FIFO buffer, thus compensating for a difference between latencies before and after an occurrence of a switchover in the optical bi-directional ring network.

DETAILED DESCRIPTION OF THE EMBODIMENTS

Figure 1:
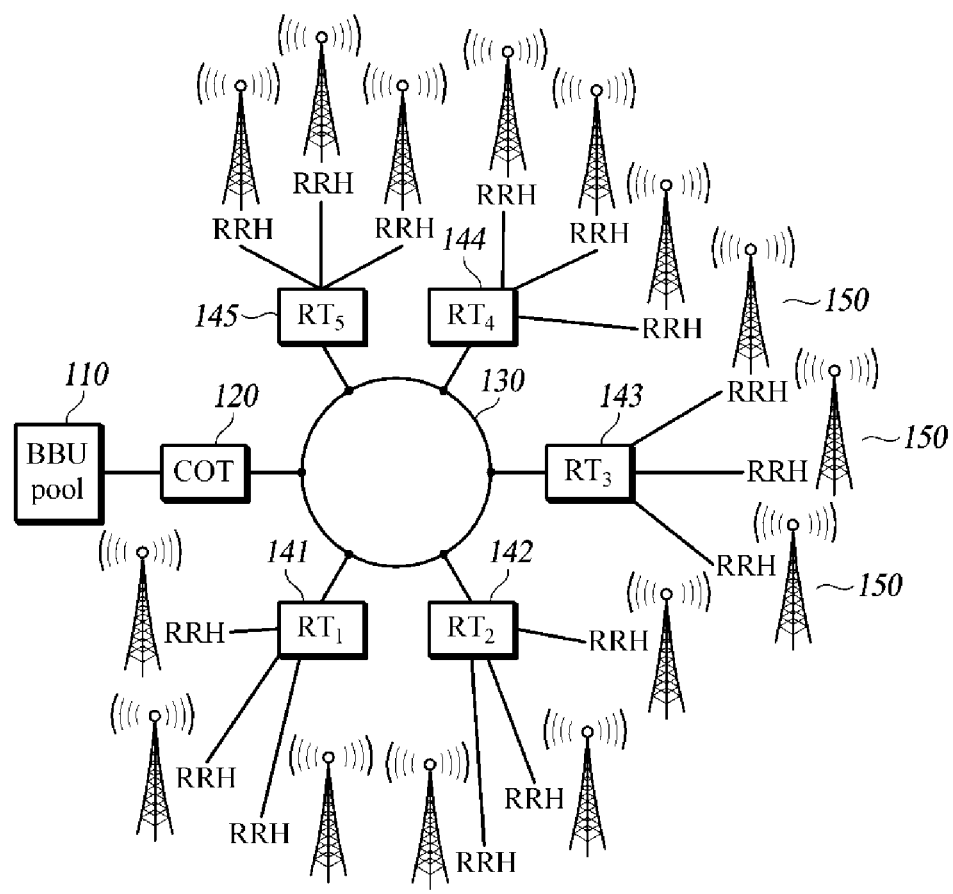
FIG. 1 is a schematic diagram of a fronthaul in a ring topology.

Exemplary embodiments of the present disclosure are described below with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Various terms such as first, second, A, B, (i), (ii), (a), (b), etc., are used solely for the purpose of differentiating one component from the other, but not to imply or suggest the substances, the order or sequence of the components. Throughout this specification, when a part "includes" or "comprises" a component, the part is meant to further include other components, not excluding thereof unless there is a particular description contrary thereto. The terms such as "unit", "module", and the like refer to units for processing at least one function or operation, which may be implemented by hardware, software, or a combination thereof.

FIG. 1 is a schematic diagram of a fronthaul configured in a ring topology.

The fronthaul in the ring topology includes a BBU (baseband unit) Pool 110 including a plurality of BBUs, a COT (central office terminal) 120, a shared optical path 130, a plurality of RTs (remote terminals) 141-145 and a plurality of RRHs (remote radio heads) 150. Through the specification, the RTs represented by the reference numerals in the 140s in FIG. 1 will be generally referred to as RT 140 to mention any ones of the plurality of RTs. In the drawings and the following description, the RRHs will be generally denoted by 150 to represent any ones of the plurality of RRHs.

Besides the elements shown in FIG. 1, the C-RAN includes a core network as a server and a terminal (e.g., a smartphone) as a client. The core network is connected to the BBU Pool 110 in a wired manner, transmits, to the BBU Pool 110, communication data to be sent to the terminal, and receives, from the BBU Pool 110, communication data sent from the terminal. The terminal is connected to the RRH 150 in a wireless manner, transmits, to the RRH 150, communication data to be sent to the core network, and receives, from the RRH 150, communication data sent from the core network.

A network including the core network and the BBU Pool 110 in the C-RAN is referred to as a backhaul, and a network including the COT 120, the shared optical path 130, the RT 140 and the RRH 150 is referred to as a fronthaul. In the pertinent art, the fronthaul is sometimes used to collectively refer to the entire C-RAN. However, in this specification, the fronthaul is used to refer to a part of the C-RAN as described above.

A communication in the fronthaul is classified into an uplink communication and a downlink communication depending on a direction of the communication. The uplink means a direction from the terminal to the core network, and the downlink means a direction from the core network to the terminal. The fronthaul is configured to perform the uplink and the downlink functions, where an uplink process is performed in a reverse manner to a downlink process. This specification presents a detailed description focusing on the downlink process, and hence the uplink process should be understood as a substantially reverse process of the downlink process.

The BBU Pool 110 is described in detail below.

In a conventional base station system including a digital signal processing device and a wireless signal transmitting and receiving device, the digital signal processing device corresponds to the BBU which converts communication data received from the core network into an optical signal. The BBU is referred to as a DU (Digital Unit) in a 3G network, and is referred to as a BBU (Baseband Unit) in a 4G (LTE) network.

The BBU Pool 110 is a group of a plurality of BBUs centralized in a central office. The BBU receives an electrical signal including the communication data from the core network, converts the received electrical signal into an optical signal, and outputs the optical signal. In this specification, the "electrical signal" includes the communication data, when it is transferred in an electrical form, and an "optical signal" includes the communication data, when it is transferred in an optical form.

In this case, the BBUs included in the BBU Pool 110 output optical signals having different wavelengths from each other. The BBUs included in the BBU Pool 110 can be designed to output optical signals of the same wavelength, which, however, needs the COT 120 to convert the optical signals of the same wavelength outputted from the respective BBUs into optical signals having different wavelengths from each other, and hence the performance of the entire network is degraded. Therefore, the BBUs are generally designed to output optical signals having different wavelengths from each other.

In the uplink process, the BBU Pool 110 converts the optical signal received from the COT 120 into an electrical signal, and transmits the electrical signal to the core network.

The COT 120 is described in detail below.

The COT 120 is also referred to as a centralization node, and performs a wavelength division multiplexing (WDM) on the optical signals having different wavelengths received from the BBU Pool 110, and transmits a multiplexed optical signal to the shared optical path 130.

The COT 120 receives the optical signals having different wavelengths from the BBU Pool 110. In the downlink process, the COT 120 multiplexes optical signals having different wavelengths received from the BBU Pool 110 by using a multiplexer (not shown). The COT 120 transmits a WDM optical signal obtained in the above manner to the shared optical path 130.

The shared optical path 130 is configured to build a bi-directional ring network, and hence the COT 120 can transmit the WDM optical signal to the shared optical path 130 in a clockwise (CW) direction, in a counterclockwise or anticlockwise (AW), or both in the CW direction and in the AW direction in a simultaneous manner. The COT 120 is configured to transmit the WDM optical signal in both directions by using an optical switch, an optical coupler, an optical splitter, and the like.

In the uplink process, the COT 120 demultiplexes the WDM optical signal received from the shared optical path 130 by using a demultiplexer (not shown), and transmits the demultiplexed optical signals to the BBU Pool 110.

The shared optical path 130 is described in detail below.

The shared optical path 130 connects the COT 120 with the plurality of RTs 140.

The shared optical path 130 is designed to build a bi-directional ring network. An optical fiber constituting the shared optical path 130 can be a uni-directional optical cable or a bi-directional optical cable. Implementing the bi-directional ring network with the uni-directional optical fiber requires an optical fiber having at least two cores or at least two optical fibers having a single core are required, and when implementing the bi-directional ring network with the bi-directional optical cable, an optical fiber having a single core suffices.

The RT 140 is described in detail below.

The RT 140 is also referred to as a distribution node, and demultiplexes the WDM optical signal received from the shared optical path 130 and distributes the demultiplexed optical signals to the plurality of RRHs 150. FIG. 1 illustrates the shared optical path 130 connected with the five RTs 141-145 which are not limited to this number depending on embodiments.

The RT 140 may utilize an optical switch (not shown) to selectively receive an optical signal transmitted in the CW direction or an optical signal transmitted in the AW direction from the shared optical path 130. For example, the RT 140 normally receives the optical signal transmitted in the AW direction, and when there occurs a switchover, receives the optical signal transmitted in the CW direction by operating the optical switch (not shown).

After receiving the WDM optical signal from the shared optical path 130, the RT 140 demultiplexes the WDM optical signal into a plurality of demultiplexed optical signals by using a demultiplexer (not shown).

The demultiplexed optical signals have different wavelengths from each other. The RT 140 converts the optical signals having different wavelengths into electrical signals, and converts the electrical signals back into optical signals having a specific wavelength, respectively. The reason for the RT 140 to convert the optical signals having different wavelengths to the electrical signals and back into the optical signals respectively having specific wavelengths is: (i) to analyze the electrical signal for determining abnormality of a signal; and (ii) to meet the requirements of the RRHs 150 connected to the RT 140, which are often designed to transmit and receive only an optical signal having a specific wavelength because of cost, management, and the like.

In the uplink process, the RT 140 utilizes a multiplexer (not shown) to multiplex the WDM optical signal received from the shared optical path 130 and the optical signals received from the RRHs 150, and transmits the multiplexed optical signal to the shared optical path 130.

The RRH 150 is described in detail below.

In a conventional base station system including a digital signal processing device and a wireless signal transmitting and receiving device, the latter corresponds to the RRH 150 which converts the optical signal received from the RT 140 into an RF signal, and outputs the RF signal. FIG. 1 illustrates each of the RTs 140 connected with only three RRHs 150 which are not limited to this number depending on embodiments. The RRH 150 is referred to as a RU (Radio Unit) in a 3G network, and is referred to as an RRH (Remote Radio Head) in a 4G (LTE) network.

The RRH 150 is a device that receives an optical signal having a specific wavelength from the RT 140, converts the received optical signal into an RF signal, and outputs the RF signal, and it may be one of devices for transmitting and receiving a 2G wave, a 3G wave and a 4G (LTE) wave, or an AP (Access Point) such as a WiFi AP.

In the uplink process, the RRH 150 converts communication data received from the terminal into an optical signal, and transmits the optical signal to the RT 140.

Figure 2A:
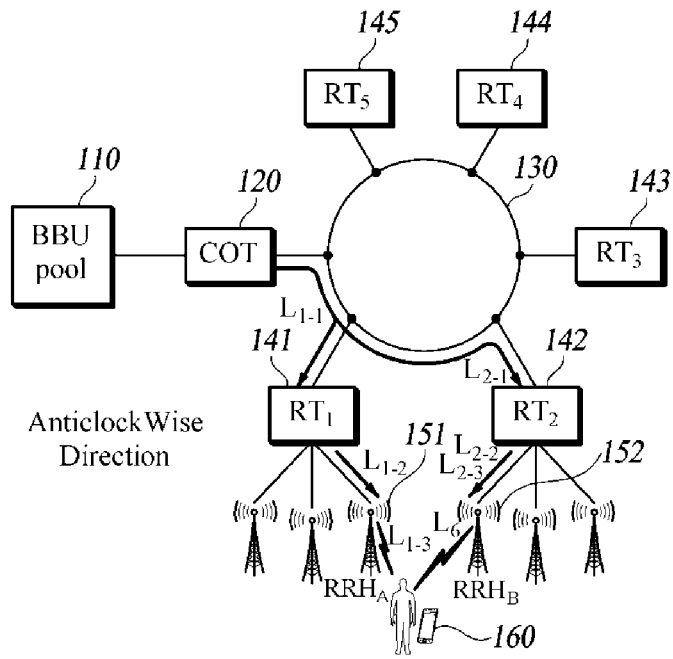
FIGS. 2A and 2B are schematic diagrams of fronthaul configurations in a ring topology for illustrating a handover failure when a switchover occurs in the fronthaul.
Figure 2B:
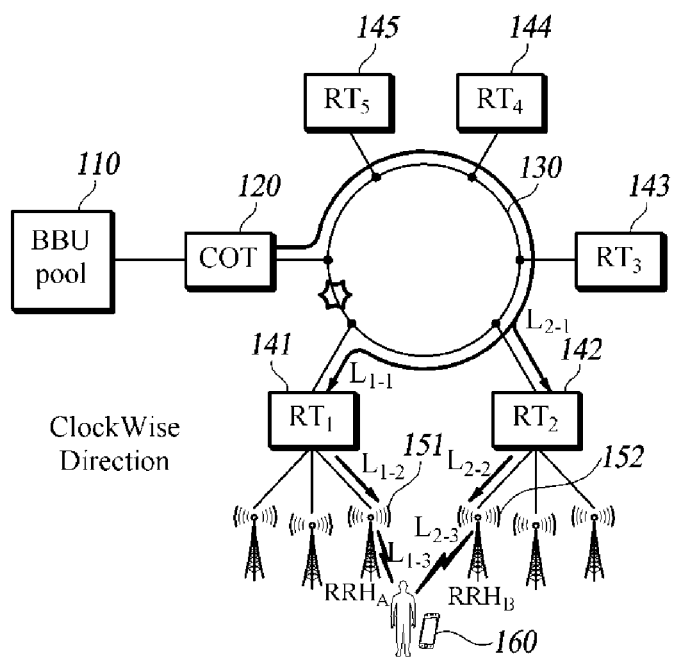

FIGS. 2A and 2B are schematic diagrams of a fronthaul in a ring topology for illustrating a handover failure when a switchover occurs in the fronthaul.

The handover changes a terminal connection from a currently serving base station to a target base station in order to provide a large amount of data with excellent quality even to a fast moving terminal. The handover from the serving base station to the target base station is divided into a hard handover and a soft handover. The hard handover is a scheme that disconnects from the serving base station and connects to the target base station right away, and the soft handover gradually disconnects from the serving base station by way of a process of simultaneously connecting to both the serving base station and the target base station.

The terminal transmits or receives various data to or from the target base station even during the handover is carried out. When the terminal moves at high speed or a large amount of data are transmitted or received, a fast handover is needed to maintain the quality of the service offered. Several ways of carrying out a fast handover are described below.

Basically, in response to an interrupted transmission of an RF signal from a base station that is currently connected, the terminal performs a handover to another base station. Further, the terminal periodically compares the communication quality with a predetermined condition and performs a handover when the communication quality fails to meet the predetermined condition. For example, a handover may be carried out when the predetermined condition is unsatisfied by values of connectivity of the backhaul, throughput of the backhaul, latency of a packet transmitted through the backhaul, jitter on the backhaul, and the like. In particular, when the latency of the packet transmitted through the backhaul exceeds a predetermined time, signifying that the connection of the backhaul is too slow for a specific communication or a specific data service, the communication can be served better by way of a handover to the second base station.

The following describes in detail a change of the latency when a switchover occurs in a fronthaul in the ring topology.

The COT 120 is configured to transmit the WDM optical signal to the shared optical path 130 in the CW direction, the AW direction, or both the CW and AW directions. Throughout the specification, it is assumed that the COT 120 transmits the WDM optical signal to the shared optical path 130 in both the CW and AW directions.

When the COT 120 transmits the WDM optical signal to the shared optical path 130 both in the CW and AW directions, the RT 140 can utilize an optical switch (not shown) to selectively receive the optical signal transmitted in the CW direction or the optical signal transmitted in the AW direction from the shared optical path 130. Throughout the specification, it is assumed that the optical switch (not shown) is adjusted in default to allow the RT 140 to receive the optical signal transmitted in the AW direction from the shared optical path 130.

FIG. 2A is a schematic diagram for illustrating the latency with an assumed counterclockwise direction of transmitting an optical signal on the shared optical path 130.

The latency of a packet received by a terminal 160 from the $RRH_A$ 151 in the AW direction is a value $L_1$ obtained by summing a time $L_{1-1}$ for which the optical signal is transferred from the COT 120 to the RT1 141, a time $L_{1-2}$ for which the optical signal is transferred from the RT1 141 to the $RRH_A$ 151, a time $L_{1-3}$ for which the wireless signal is transferred from the $RRH_A$ 151 to the terminal 160, and other time $L_{1-4}$.

The latency of a packet received by the terminal 160 from the $RRH_B$ 152 in the AW direction is a value $L_2$ obtained by summing a time $L_{2-1}$ for which the optical signal is transferred from the COT 120 to the RT2 142, a time $L_{2-2}$ for which the optical signal is transferred from the RT2 142 to the $RRH_B$ 152, a time $L_{2-3}$ for which the wireless signal is transferred from the $RRH_B$ 152 to the terminal 160, and other time $L_{2-4}$.

It is assumed that, when the optical signal transmission direction is the AW direction, $L_1$ is shorter than $L_2$, and the terminal 160 performs a communication with the $RRH_B$ 152.

The bi-directional ring network is configured to prevent the entire network from halting, even when a partial breakdown occurs, by changing the direction of transmitting the signal, which is referred to as a protective switchover of the ring network. While receiving the optical signal transmitted in the AW direction, when a partial breakdown occurs in the network, the RT 140 receives the optical signal transmitted in the CW direction by adjusting the optical switch (not shown).

FIG. 2A is a schematic diagram for illustrating the latency when a direction of transmitting an optical signal is changed to the clockwise direction due to a partial breakdown on the shared optical path 130.

The latency of a packet received by the terminal 160 from the $RRH_A$ 151 in the CW direction equals to a value $L_1$ obtained by summing a transfer time $L_{1-1}$ of the optical signal from the COT 120 to the RT1 141, a transfer time $L_{1-2}$ of the optical signal from the RT1 141 to the $RRH_A$ 151, a transfer time $L_{1-3}$ of the wireless signal from the $RRH_A$ 151 to the terminal 160, and other time $L_{1-4}$. With the signal transmission direction changed to the CW direction, a transfer time $L_{1-1}'$ of the optical signal from the COT 120 to the RT1 141 is increased compared to the existing transfer time $L_{1-1}$. The latency changed at the time of the protective switchover for the RT1 141 is now referred to as a latency difference value Δ of the RT1 141.

The latency of a packet received by the terminal 160 from the $RRH_B$ 152 in the CW direction equals to a value $L_2$ obtained by summing a transfer time $L_{2-1}$ of the optical signal from the COT 120 to the RT2 142, a transfer time $L_{2-2}$ of the optical signal from the RT2 142 to the $RRH_B$ 152, a transfer time $L_{2-3}$ of the wireless signal from the $RRH_B$ 152 to the terminal 160, and other time $L_{2-4}$. With the signal transmission direction changed to the CW direction, a transfer time $L_{2-1}'$ of the optical signal from the COT 120 to the RT2 142 is increased compared to the existing transfer time $L_{2-1}$; however, the increased amount is smaller than that for the RT1 141. The latency changed at the time of the protective switchover for the RT2 142 is now referred to as a latency difference value Δ of the RT2 142.

In the example shown in FIG. 2, the latency difference value Δ of the RT1 141 is larger than that of the RT2 142, and hence $L_1$ can be larger than $L_2$ at the time of the protective switchover. In this case, the terminal 160 performs a handover from the $RRH_A$ 151 to the $RRH_B$ 152. However, this is merely a change of the latency due to the protective switchover and still results in a handover failure because the $RRH_A$ 151 is the closest base station to the terminal 160 to be capable of carrying out a smooth communication.

Therefore, in order to prevent an error that can be caused from various controls based on the latency, such as a handover failure, the latency difference value Δ needs to be compensated.

Figure 3A:
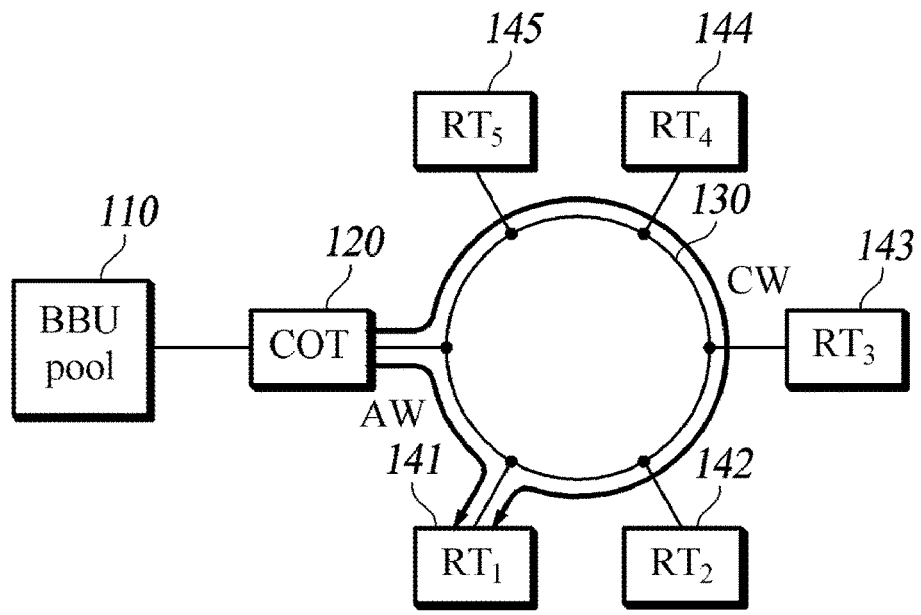
FIGS. 3A and 3B are schematic diagrams of fronthaul configurations in a ring topology for illustrating a latency difference in the fronthaul for each position of a distribution node (or remote terminal: RT).
Figure 3B:
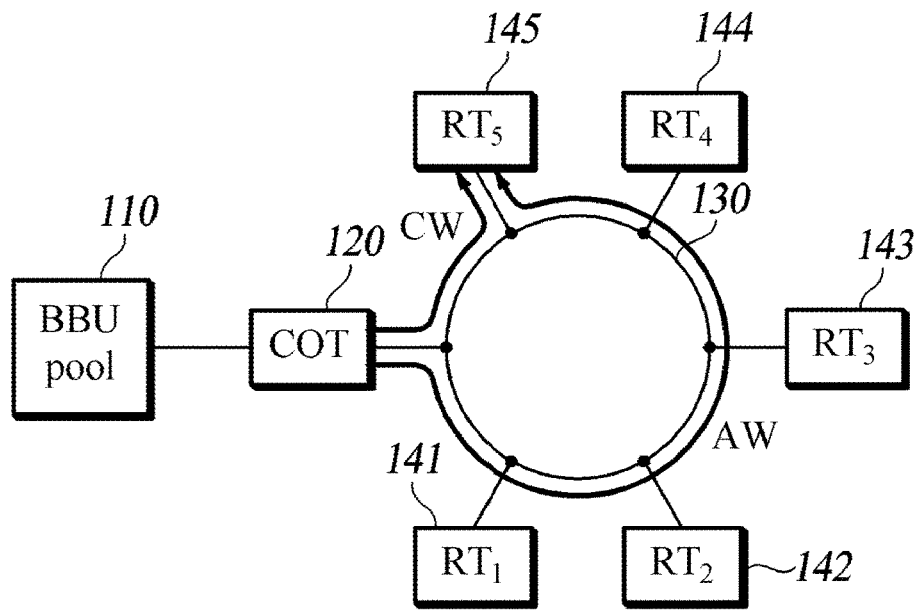

FIGS. 3A and 3B are schematic diagrams of fronthaul configurations in a ring topology for illustrating a latency difference in the fronthaul for each distribution node (RT) location.

The latency difference value Δ of the RT 140 can be calculated by using Equation 1, 2 or 3.

Latency Difference Value Δ=Clockwise Latency− Counterclockwise Latency     Equation 1

Latency Difference Value Δ=Counterclockwise Latency−Clockwise Latency     Equation 2

Latency Difference Value Δ=|Counterclockwise Latency−Clockwise Latency|     Equation 3

In this specification, the latency difference value Δ is calculated by using Equation 1 for the sake of convenience of explanation. Therefore, any one of Equations 1, 2, and 3 can be used for the calculation of the latency difference value Δ.

The latency difference value Δ depends on a location of the RT 140, and hence Δ needs to be calculated for each of the RTs 140. Each RT 140 measures, by adjusting the optical switch (not shown), a first latency in case of the optical signal transfer in the CW direction and a second latency in case of the optical signal transfer in the AW direction on the shared optical path 130, and stores, in a memory (not shown), the latency difference value Δ obtained by subtracting the second latency with the AW optical signal from the first latency with the CW optical signal.

For example, in FIG. 3A, the latency difference value Δ of the RT1 141 is positive. That is, when the optical signal transmission in the AW direction reverses to the CW direction, the latency of the RT1 141 is increased. On the contrary, when the optical signal transmission in the CW direction reverses to the AW direction, the latency of the RT1 141 is decreased.

On the other hand, in FIG. 3B, the latency difference value Δ of the RT2 142 is negative. That is, when the optical signal transmission in the AW direction reverses to the CW direction, the latency of the RT2 142 is decreased. On the contrary, when the optical signal transmission in the CW direction reverses to the AW direction, the latency of the RT2 142 is increased.

Unless compensation is performed on the latency difference that is increased or decreased due to the switchover, the aforementioned error such as a handover failure may occur in various controls performed based on the latency.

A method of compensating for the latency difference is described in detail below.

A method of compensating for the latency difference of the RT1 141 is first described with reference to FIG. 3A. In FIG. 3A, the latency difference value Δ of the RT1 141 is positive. Therefore, when the latency is increased due to a change of the optical signal transmission in the AW direction to the CW direction, the latency difference can be compensated by subtracting the latency difference value (Δ>0) from the current latency of the RT1 141. On the contrary, when the latency is decreased due to a redirection of the optical signal transmission in the CW direction to the AW direction, the latency difference can be compensated by adding the latency difference value (Δ>0) to the current latency of the RT1 141.

The following describes a method of compensating for the latency difference of the RT2 142 with reference to FIG. 3B. In FIG. 3B, the latency difference value Δ of the RT2 142 is negative. Therefore, when the latency is decreased due to the change of the optical signal transmission in the AW direction to the CW direction, the latency difference can be compensated by subtracting the latency difference value (Δ>0) from the current latency of the RT2 142. On the contrary, when the latency is increased due to the change of the optical signal transmission in the CW direction to the AW direction, the latency difference can be compensated by adding the latency difference value (Δ>0) to the current latency of the RT2 142.

In conclusion, when the optical signal transmission reverses from the AW direction to the CW direction, each RT 140 can compensate for the latency difference by using Equation 4. The latency difference value Δ used in Equation 4 is obtained from Equation 1.

Latency After Changing Direction=Latency Before Changing Direction−Latency Difference Value Δ   Equation 4

When the optical signal transmission direction in the CW direction reverses to the AW direction, the RT 140 can compensate for the latency difference by using Equation 5. The latency difference value Δ used in Equation 5 is obtained from Equation 1.

Latency After Changing Direction=Latency Before Changing Direction+Latency Difference Value Δ   Equation 5

Decreasing or increasing the latency of the RT 140 based on the values obtained from Equations 4 and 5 can be achieved by adjusting the size of a buffer of the RT 140. The buffer of the RT 140 is described below.

Figure 4:
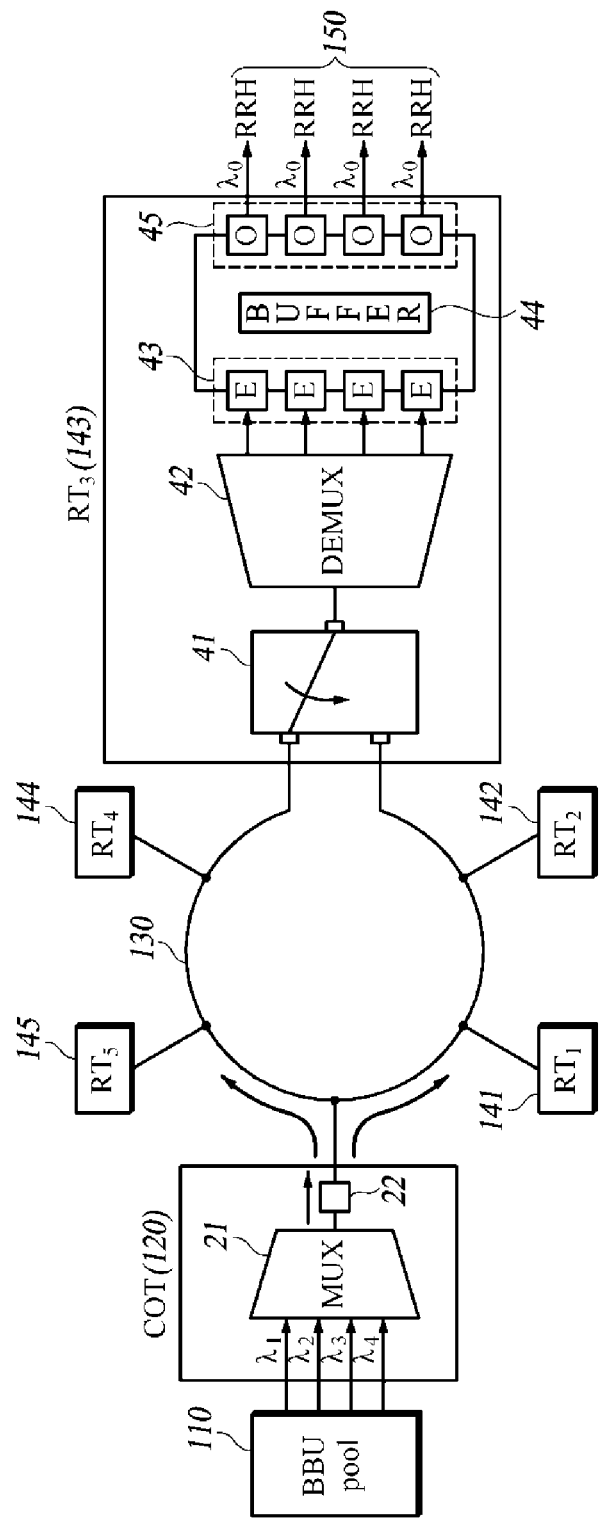
FIG. 4 is a schematic diagram of a detailed structure of a central node (or central office terminal: COT) and a distribution node (RT) in a fronthaul in a ring topology.

FIG. 4 is a schematic diagram of a detailed structure of a central node and a distribution node in a fronthaul in a ring topology.

As shown in FIG. 4, the COT 120 includes a multiplexer 21 for performing a wavelength division multiplexing (WDM) on optical signals received from the BBU Pool 110 and having different wavelengths from each other and an output unit 22 for transmitting the WDM optical signal to the shared optical path 130 in the CW direction, in the AW direction, or both in the CW and AW directions. The output unit 22 includes an optical switch, an optical coupler, an optical splitter, and the like.

As shown in FIG. 4, the RT 140 includes an optical switch 41 for selectively receiving the WDM optical signal transferred in the CW direction or the WDM optical signal transferred in the AW direction from the shared optical path 130, and a demultiplexer 42 for demultiplexing the WDM optical signal. The RT 140 further includes an optical-to-electrical signal converting unit 43 for converting the demultiplexed optical signals from the demultiplexer 42 into electrical signals, a buffer 44 for inputting and outputting the electrical signals, and an electrical-to-optical signal converting unit 45 for converting an electrical signal into an optical signal.

As described above, the demultiplexed optical signals from the demultiplexer 42 have different wavelengths. However, the RRH 150 connected to the RT 140 is often designed to transmit or receive only a specific wavelength, and therefore the wavelength of the optical signal needs to be converted at the RT 140. To this end, the RT 140 converts the optical signal into the electrical signal and stores the electrical signal in the buffer 44. By increasing or decreasing the size of the buffer 44, the RT 140 can increase or decrease the latency of the packet transmitted or received by the terminal 160.

FIGS. 5A to 5D are schematic diagrams for illustrating a method for adjusting a size of a FIFO buffer.

The buffer 44 generally used in the distribution node (RT) is a FIFO (First In First Out) buffer, and hence the FIFO buffer 44 is used in the following description.

The FIFO buffer 44 includes a write pointer (WP) and a read pointer (RP). The WP indicates an address next to a currently writing buffer address, and the RP indicates an address next to a currently reading buffer address. When it is assumed that the FIFO buffer 44 has its memory address increased from the bottom to the top thereof in the example shown in FIG. 5, the WP moves up when data is being written in the buffer 44, and the RP moves up when data is being read from the buffer 44.

In order for the data to be smoothly inputted and outputted, the reading speed of the buffer 44 needs to be same as the writing speed of the buffer 44. A buffer overflow occurs when the reading speed is slower than the writing speed, and an under flow occurs when the reading speed is faster than the writing speed. Therefore, the reading speed is generally set to be same as the writing speed.

The size of the buffer 44 can be adjusted by offsetting RP or WP in the FIFO buffer 44.

Figure 5A:
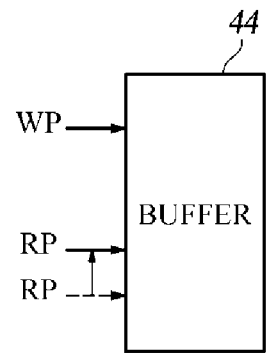
FIGS. 5A to 5D are schematic diagrams for illustrating a method for adjusting a size of a FIFO buffer.

As shown in FIG. 5A, the size of the buffer 44 is decreased when the RP is offset in a direction in which the address of the RP increases, and accordingly a time interval between input and output is decreased.

Figure 5B:
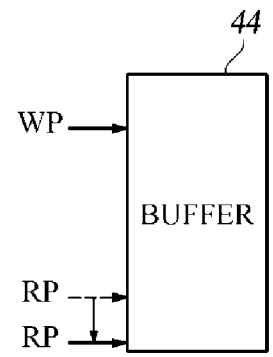

As shown in FIG. 5B, the size of the buffer 44 is increased when the RP is offset in a direction in which the address of the RP decreases, and accordingly the time interval between input and output is increased.

Figure 5C:
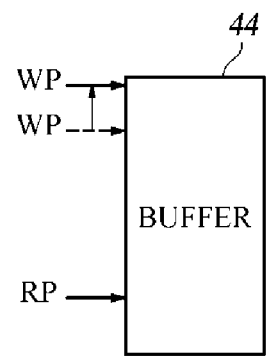

As shown in FIG. 5C, the size of the buffer 44 is increased when the WP is offset in a direction in which the address of the WP increases, and accordingly the time interval between input and output is increased.

Figure 5D:
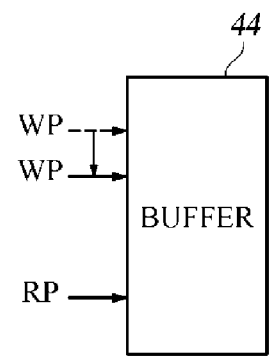

As shown in FIG. 5D, the size of the buffer 44 is decreased when the WP is offset in a direction in which the address of the WP decreases, and accordingly the time interval between input and output is decreased.

Referring to Equation 4, when the optical signal transmission reverses from the AW direction to the CW direction, the latency difference can be compensated by changing the latency by "− latency difference value Δ". That is, when the latency difference value Δ is positive, the latency is decreased by decreasing the size of the buffer 44, and when the latency difference value Δ is negative, the latency is increased by increasing the size of the buffer 44, thus compensating for the latency difference.

The size of the buffer can be adjusted by offsetting RP or WP. That is, the latency difference can be compensated for by offsetting RP by +Δ×k (k is proportional constant) or offsetting WP by −Δ×k.

Referring to Equation 5, when the optical signal transmission reverses from the CW direction to the AW direction, the latency difference can be compensated for by changing the latency by "+latency difference value Δ". That is, when the latency difference value Δ is positive, the latency is increased by increasing the size of the buffer 44, and when the latency difference value Δ is negative, the latency is decreased by decreasing the size of the buffer 44, thus compensating for the latency difference.

The size of the buffer can be adjusted by offsetting RP or WP. That is, the latency difference can be compensated by offsetting RP by −Δ×k (k is proportional constant) or offsetting WP by +Δ×k.

Figure 6:
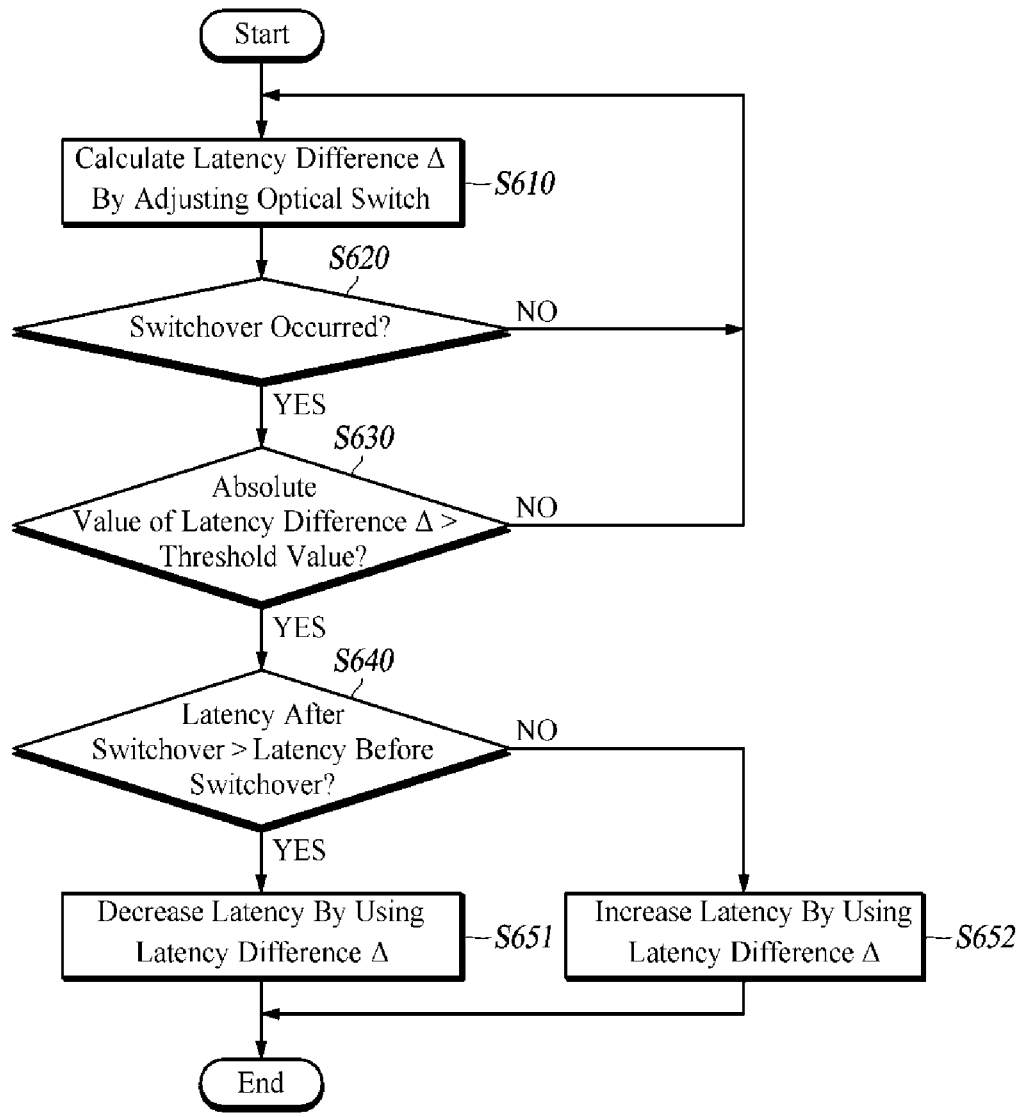
FIG. 6 is a flowchart of a method for compensating a latency difference due to a switchover in a fronthaul in a ring topology.

FIG. 6 is a flowchart of a method of compensating for a latency difference due to a switchover in a fronthaul in a ring topology.

In Step S610, each RT 140 adjusts the optical switch 41 to measure a first latency for when the optical signal is transmitted in the CW direction and a second latency for when the optical signal is transmitted in the AW direction, and stores, in a memory (not shown), a value, i.e., the latency difference value Δ, obtained by subtracting the second latency with the AW optical signal from the first latency with the CW optical signal. The latency difference value Δ can be measured after occurrence of a switchover; however, for a quick response to the switchover, it is preferred to measure the value in advance for each of the RTs 140.

In Step S620, the RT 140 determines whether or not there occurred a switchover, and if yes, changes the optical signal reception direction by adjusting the optical switch 41.

In Step S630, the RT 140 does not compensate for the latency difference despite the switchover occurred if the latency difference value Δ stored in the memory (not shown) is smaller than a predetermined threshold value. Each RT 140 compensates for the latency difference by offsetting RP or WP of the FIFO buffer 44; however, there may be a problem of data interruption during the process of offsetting RP or WP, and hence when the latency difference value Δ is small enough, it may be advantageous not to compensate for the latency difference due to the switchover for the purpose of securing quality communications. In some embodiments, Step S630 is omitted.

In Step S640, each RT 140 determines whether or not the latency after switchover is larger than the latency before switchover. If the latency after switchover is larger than the latency before switchover, (YES in Step S640), the RT 140 decreases the latency based on the latency difference value Δ (Step S651), and if the latency after switchover is smaller than the latency before switchover (NO in Step S640), the RT 140 increases the latency based on the latency difference value Δ (Step S652). The determination of the magnitude comparison between the latencies before and after the switchover can be made based on the signal transmission direction changed by the switchover and the sign of the latency difference value Δ.

Steps S610 to S652 are described to be sequentially performed in FIG. 6 as a mere example for describing the technical idea of some embodiments, although the example shown in FIG. 6 is not limited to the chronological order. One of ordinary skill in the pertinent art would appreciate that various modifications, additions and substitutions are possible by performing in a different order from that of Steps S610 to S652 of the method in FIG. 6 or at least one of Steps S610 to S652 in parallel without departing from the idea and scope of the embodiments.

According to some embodiments of the present disclosure as described above, a method is provided for compensating for a difference between latencies before and after a switchover to eliminate a possible error due to a change of latency from occurring in various latency-based controls.

Although exemplary embodiments of the present disclosure have been described for illustrative purposes, those skilled in the art will appreciate that various modifications, additions and substitutions are possible, without departing from the various characteristics of the disclosure.

What is claimed is:

1. A system for compensating for a latency difference due to switchover in a fronthaul in ring topology, the system comprising:
   a centralization node linked to a baseband unit (BBU) group centralized in a central office;
   a plurality of distribution nodes linked to a plurality of remote radio head (RRH) groups distributed in remote locations;
   an optical bi-directional ring network connecting the central node and the plurality of distribution nodes and configured to allow a wavelength-division multiplexed (WDM) optical signal to be transmitted and received between the central node and the plurality of distribution nodes; and
   a first-in-first-out (FIFO) buffer configured to store an electrical signal, wherein
   each of the plurality of distribution nodes is configured to
      demultiplex the WDM optical signal,
      convert each demultiplexed optical signal into an electrical signal,
      store the electrical signal in the FIFO buffer,
      convert the electrical signal stored in the FIFO buffer into an optical signal, and
      adjust a size of the FIFO buffer, thus compensating for a difference between latencies before and after an occurrence of a switchover in the optical bi-directional ring network.

2. The system according to claim 1, wherein each of the plurality of distribution nodes is configured to store, in a memory, a latency difference value Δ obtained by subtracting a first latency from a second latency, the first latency being defined when the WDM optical signal is transmitted in a counterclockwise direction and the second latency being defined when the WDM optical signal is transmitted in a clockwise direction in the optical bidirectional ring network.

3. The system according to claim 2, wherein each of the plurality of distribution nodes is configured to compensate for the difference between latencies before and after the occurrence of the switchover based on the latency difference value Δ.

4. The system according to claim 3, wherein
each of the plurality of distribution nodes is further configured to compare an absolute value of the latency difference value Δ with a predetermined threshold, and
when the absolute value of the latency difference value Δ is larger than the predetermined threshold, each of the plurality of distribution nodes is configured to compensate for the difference between the latencies.

5. The system according to claim 3, wherein when a signal transfer is redirected by the switchover from the counterclockwise direction to the clockwise direction, each of the plurality of distribution nodes is configured to decrease the size of the FIFO buffer when the latency difference value Δ is positive and to increase the size of the FIFO buffer when the latency difference value Δ is negative.

6. The system according to claim 3, wherein when a signal transfer is redirected by the switchover from the counterclockwise direction to the clockwise direction, each of the plurality of distribution nodes is configured to offset an address of a read pointer of the FIFO buffer by +Δ×k, where k is a proportional constant.

7. The system according to claim 3, wherein when a signal transfer is redirected by the switchover from the counterclockwise direction to the clockwise direction, each of the plurality of distribution nodes is configured to offset an address of a write pointer of the FIFO buffer by −Δ×k, where k is a proportional constant.

8. The system according to claim 3, wherein when a signal transfer is redirected by the switchover from the clockwise direction to the counterclockwise direction, each of the plurality of distribution nodes is configured to increase the size of the FIFO buffer when the latency difference value Δ is positive and to decrease the size of the FIFO buffer when the latency difference value Δ is negative.

9. The system according to claim 3, wherein when a signal transfer is redirected by the switchover from the clockwise direction to the counterclockwise direction, each of the plurality of distribution nodes is configured to offset an address of a read pointer of the FIFO buffer by −Δ×k, where k is a proportional constant.

10. The system according to claim 3, wherein when a signal transfer is redirected by the switchover from the clockwise direction to the counterclockwise direction, each of the plurality of distribution nodes is configured to offset an address of a write pointer of the FIFO buffer by +Δ×k, where k is a proportional constant.

11. A method of compensating for a latency difference due to switchover in a fronthaul in ring topology, the fronthaul comprising a centralization node linked to a baseband unit (BBU) group centralized in a central office, a plurality of distribution nodes linked to a plurality of remote radio head (RRH) groups distributed in remote locations, an optical bi-directional ring network connecting the central node and the plurality of distribution nodes and configured to allow a wavelength-division multiplexed (WDM) optical signal to be transmitted and received between the central node and the plurality of distribution nodes, and a first-in-first-out (FIFO) buffer configured to store an electrical signal, the method performed by each of the plurality of distribution nodes, the method comprising:
demultiplexing the WDM optical signal,
converting each demultiplexed optical signal into an electrical signal,
storing the electrical signal in the FIFO buffer,
converting the electrical signal stored in the FIFO buffer into an optical signal, and
adjusting a size of the FIFO buffer, thus compensating for a difference between latencies before and after an occurrence of a switchover in the optical bi-directional ring network.

12. The method according to claim 11, further comprising storing, by each of the plurality of distribution nodes, in a memory, a latency difference value Δ obtained by subtracting a first latency for when the WDM optical signal is transmitted in a counterclockwise direction, from a second latency for when the WDM optical signal is transmitted in a clockwise direction in the optical bidirectional ring network.

13. The method according to claim 12, further comprising compensating for, by each of the plurality of distribution nodes, the difference between latencies before and after the occurrence of the switchover based on the latency difference value Δ.

14. The method according to claim 13, further comprising comparing an absolute value of the latency difference value Δ with a predetermined threshold, wherein
the compensating includes compensating for the difference between the latencies when the absolute value of the latency difference value Δ is larger than the predetermined threshold.

15. The method according to claim 13, wherein when a signal transfer is redirected by the switchover from the counterclockwise direction to the clockwise direction, the compensating includes
decreasing the size of the FIFO buffer when the latency difference value Δ is positive, and
increasing the size of the FIFO buffer when the latency difference value Δ is negative.

16. The method according to claim 13, wherein when a signal transfer is redirected by the switchover from the counterclockwise direction to the clockwise direction, the compensating includes offsetting an address of a read pointer of the FIFO buffer by +Δ×k, where k is a proportional constant.

17. The method according to claim 13, wherein when a signal transfer is redirected by the switchover from the counterclockwise direction to the clockwise direction, the compensating includes offsetting an address of a write pointer of the FIFO buffer by −Δ×k, where k is a proportional constant.

18. The method according to claim 13, wherein when a signal transfer is redirected by the switchover from the clockwise direction to the counterclockwise direction, the compensating includes
increasing the size of the FIFO buffer when the latency difference value Δ is positive, and
decreasing the size of the FIFO buffer when the latency difference value Δ is negative.

19. The method according to claim 13, wherein when a signal transfer is redirected by the switchover from the clockwise direction to the counterclockwise direction, the compensating includes offsetting an address of a read pointer of the FIFO buffer by −Δ×k, where k is a proportional constant.

20. The method according to claim 13, wherein when a signal transfer is redirected by the switchover from the clockwise direction to the counterclockwise direction, the compensating includes offsetting an address of a write pointer of the FIFO buffer by +Δ×k, where k is a proportional constant.

* * * * *